(12) United States Patent
Mahy et al.

(10) Patent No.: US 7,717,210 B2
(45) Date of Patent: May 18, 2010

(54) VEHICLE

(76) Inventors: Graham John Mahy, 122C Colletts Road, Mangaroa Valley, Upper Hutt (NZ); Gordon James Tobin, 15 Tararua Street, Trentham, Upper Hutt (NZ); Benjamin Mark Glossop, 4 Waikato Street, Island Bay, Wellington (NZ)

( * ) Notice: Subject to any disclaimer, the term of this patent is extended or adjusted under 35 U.S.C. 154(b) by 172 days.

(21) Appl. No.: 11/911,811

(22) PCT Filed: Apr. 11, 2006

(86) PCT No.: PCT/NZ2006/000070

§ 371 (c)(1),
(2), (4) Date: Oct. 17, 2007

(87) PCT Pub. No.: WO2006/112732

PCT Pub. Date: Oct. 26, 2006

(65) Prior Publication Data

US 2008/0190682 A1    Aug. 14, 2008

(30) Foreign Application Priority Data

Apr. 20, 2005   (NZ) ..................... 539543

(51) Int. Cl.
*B62D 61/12* (2006.01)

(52) U.S. Cl. .................................... 180/209
(58) Field of Classification Search .......... 180/209, 180/210, 213, 237, 245, 65.1, 65.5, 89.13, 180/906–908, 8.2, 8.7, 7.1, 345, 208, 21, 180/901; 280/647
See application file for complete search history.

(56) References Cited

U.S. PATENT DOCUMENTS

| 3,825,087 A | 7/1974 | Wilson |
| 4,274,503 A | 6/1981 | Mackintosh |
| 4,648,615 A | 3/1987 | Volin |
| 4,813,693 A | 3/1989 | Lockard et al. |
| 4,941,540 A | 7/1990 | Bernstein |

(Continued)

FOREIGN PATENT DOCUMENTS

AU    588519    1/1985

(Continued)

OTHER PUBLICATIONS

Peter Rojas, "More Pics of Toyota's i-Unit Personal Mobility Vehicle", Engadget, Dec. 8, 2004, 9 pages, (http://www.endqadget.com/2004/12/08/more-pics-of-toyotas-i-unit-personal-mobility-vehicle/).

(Continued)

*Primary Examiner*—Faye M. Fleming
(74) *Attorney, Agent, or Firm*—Blakely, Sokoloff, Taylor & Zafman LLP

(57) ABSTRACT

A vehicle for transporting a person has a chassis (103) and four wheels (105*a*, 105*b*, 150*c*, 105*d*) supporting the chassis above a ground surface. The wheels enable the vehicle to move along the ground surface. Each of the four wheels is adjustable in position to enable the wheelbase length and track width of the vehicle to be changed. Each of the wheels is steerable to enable the changes in the wheelbase length and the track width to be effected whether the vehicle is substantially stationary or in motion.

24 Claims, 16 Drawing Sheets

U.S. PATENT DOCUMENTS

| | | | |
|---|---|---|---|
| 4,989,890 | A | 2/1991 | Lockard et al. |
| 5,301,964 | A | 4/1994 | Papac |
| 5,547,038 | A | 8/1996 | Madwed |
| 5,782,483 | A | 7/1998 | Rogers et al. |
| 5,884,928 | A | 3/1999 | Papac |
| 6,109,379 | A | 8/2000 | Madwed |
| 6,164,674 | A | 12/2000 | Rogers et al. |
| 6,183,002 | B1 | 2/2001 | Choi et al. |
| 6,206,126 | B1 | 3/2001 | Thiermann et al. |
| 6,374,934 | B1 | 4/2002 | Beck et al. |
| 2002/0109331 | A1 | 8/2002 | Barclay |
| 2003/0168832 | A1 | 9/2003 | Flowers et al. |
| 2006/0138835 | A1 | 6/2006 | Pelka et al. |

FOREIGN PATENT DOCUMENTS

| | | |
|---|---|---|
| DE | 3414204 | 10/1985 |
| DE | 19933052 | 11/2000 |
| DE | 19947102 | 3/2001 |
| EP | 0885605 | 12/1998 |
| GB | 767420 | 2/1957 |
| GB | 1 586 440 | 3/1981 |
| GB | 2141980 | 1/1985 |
| GB | 2201588 | 9/1988 |
| GB | 2 402 658 B | 9/2006 |
| JP | 53-087424 | 8/1978 |
| JP | 05-96922 | 4/1993 |
| JP | 11-056923 | 3/1999 |
| JP | 11-92091 | 4/1999 |
| JP | 2001-048497 | 2/2001 |
| JP | 2002272791 A | 9/2002 |
| NZ | 242929 | 7/1994 |
| NZ | 532715 | 9/2002 |
| WO | WO 93/10735 | 6/1993 |
| WO | WO 93/20791 | 10/1993 |
| WO | WO 96/39320 | 12/1996 |
| WO | WO 2004/024541 | 3/2004 |
| WO | WO 2004/030596 | 4/2004 |
| WO | WO 2004/082548 | 9/2004 |

OTHER PUBLICATIONS

"i-Unit Overview", TOYOTA.CO.JP—News Release, Dec. 3, 2004, 2 pages, (http://www.toyota.co.jp/en/news/04/1203_le.html).

Innovate, Industrial Research Limited, Issue 34, Dec. 1999, 5 pages, (http://www.irl.cri.nz/whats_happening/innovate/issues/indec99.html).

PCT International Search Report for PCT/NZ2006/000070, dated Apr. 27, 2007, 4 pages.

VEHICLE

CROSS-REFERENCE TO OTHER APPLICATIONS

This is a National Phase of International Application No. PCT/NZ2006/000070, filed on Apr. 11, 2006, which claims priority from New Zealand Patent Application No. 539543, filed on Apr. 20, 2005.

FIELD OF THE INVENTION

This invention relates to a vehicle for transporting a person. More particularly, although not exclusively, the invention relates to a mobility vehicle for use by a person with impaired mobility. The vehicle could be a different type of vehicle however, such as a golf cart.

BACKGROUND

It is known to provide wheelchairs or the like to transport persons with limited mobility, such as the infirm, aged, or disabled. Conventional wheelchairs are manually powered devices, either moved by the occupant's own power (generally by pushing enlarged rear wheels) or by another person pushing the wheelchair. Known powered wheelchairs are generally similar in concept to earlier wheelchairs, but have an electric motor to drive the wheels of the wheelchair. These conventional wheelchairs are generally not very stable, and are therefore prone to tipping. Further, electric wheelchairs are often provided with low ground clearance and small wheels, making them only suitable for use on smooth surfaces.

Electric mobility scooters are also available, but again generally have low ground clearance and are therefore generally only suitable for use on relatively smooth ground surfaces.

U.S. Pat. No. 5,782,483, U.S. Pat. No. 4,989,890, U.S. Pat. No. 6,164,674, and U.S. Pat. No. 5,301,964 describe adjustable wheelchairs.

JP 2001-48497, JP 11-92091, JP 53-87424, and US 2003/0168832 describe vehicles with adjustable wheelbases.

JP 5-96922 describes an automobile with height adjustable suspension.

NZ 242929 describes an off-road vehicle.

U.S. Pat. No. 3,825,087 describes an agricultural vehicle.

The applicants are also aware of a Toyota conceptual vehicle named the 1-UNIT.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior alt or form part of the common general knowledge in the art.

It is an object of at least preferred embodiments of the present invention to provide a vehicle that is adjustable so it is suitable for use over a variety of terrains and conditions, or which at least provides the public with a useful alternative.

SUMMARY OF THE INVENTION

The term 'comprising' as used in this specification and claims means 'consisting at least in part of', that is to say when interpreting statements in this specification and claims which include that term, the features prefaced by that term in each statement all need to be present but other features can also be present. Related terms such as 'comprise', 'comprises', and 'comprised' are to be interpreted in a similar manner.

In accordance with a first aspect of the present invention, there is provided a vehicle for transporting a person, comprising a chassis and four wheels supporting the chassis above a ground surface and which enable the vehicle to move along the ground surface, each of the four wheels being adjustable in position to enable the wheelbase length and the track width of the vehicle to be changed, and each of the four wheels being steerable to enable the changes in the wheelbase length and the track width to be effected when the vehicle is occupied, whether the vehicle is substantially stationary or in motion.

Preferably, each of the four wheels is independently drivable.

The vehicle may be a mobility vehicle, or may be a different type of vehicle such as a golf cart or the like.

The vehicle is preferably configured such that the wheelbase length and the track width of the vehicle are adjusted concurrently.

The vehicle is suitably adjustable between a first configuration of the chassis in which the wheelbase length and track width are a minimum size and a second configuration of the chassis in which the wheelbase length and track width are a maximum size. Preferably, the chassis is fully functional in any configuration between the first and second configurations.

Preferably, the wheels are steered such that they move between a configuration in which all wheels are directed outwardly such that portions of the wheels distal a central portion of the chassis aim outwardly from the chassis in the first configuration of the chassis and a configuration in which the wheels are generally parallel in the second configuration of the chassis, to minimise damage to the ground surface if the chassis is adjusted between the first and second configuration when the vehicle is substantially stationary. The wheels located toward one end of the vehicle are suitably driven in an opposite direction to the wheels located toward the other end of the vehicle, as the chassis is adjusted between the first and second configuration.

Preferably, the wheels can adopt a configuration in which all wheels are directed inwardly such that portions of the wheels distal a central portion of the chassis aim inwardly, such that the vehicle can be turned with little or no linear movement of the vehicle. Each wheel may be driven in the same rotational direction when viewed from outside the respective wheel, to turn the vehicle.

Preferably, the wheels can adopt a configuration in which the wheels located toward one end of the vehicle both aim in one direction, and the wheels located toward the other end of the vehicle both aim in the opposite direction, to enable the vehicle to negotiate relatively sharp turns.

Preferably, the wheels can adopt a configuration in which the wheels located toward one end of the vehicle both aim in one direction, and the wheels located toward the other end of the vehicle both aim in the same direction as the other wheels, to enable the vehicle to achieve a translational movement.

Preferably, the wheels located toward one end of the vehicle are supported by respective arms that are operatively connected to a first support block, and the wheels located toward the other end of the vehicle are supported by respective arms that are operatively connected to a second support block, and the support blocks are slidable along part of the chassis such that when the support blocks are in their most spaced apart positions the wheelbase length and track width are a maximum size and when the support blocks are in their most close together positions the wheelbase length and track width are a minimum size.

The vehicle suitably comprises a drive motor associated with each of the wheels and configured such that each of the wheels can be independently driven by its respective drive motor. The drive motors are advantageously electric motors.

Preferably, each drive motor and thereby each wheel can be driven in a forward or rearward direction.

Advantageously, a vertical position of each wheel relative to a central portion of the chassis is adjustable and the vehicle comprises a control system configured to automatically adjust the vertical position of any one or more of the wheels relative to the central portion of the chassis to maintain the centre of gravity towards the centre of the vehicle and substantially maintain the occupant's orientation.

The vehicle may be configured such that the centre of gravity of an occupant of the vehicle is lower in the second configuration of the chassis than in the first configuration of the chassis. A central portion of the chassis may be lower in the second configuration of the chassis than in the first configuration of the chassis. Alternatively, or in addition, a seat for supporting the occupant of the vehicle may be lower to the chassis in the second configuration of the chassis than in the first configuration of the chassis.

Preferably, the vehicle comprises a seat for supporting an occupant and a mounting arrangement which mounts the seat to the chassis, wherein the mounting arrangement is configured such that the seat can be moved from a first in-use position wherein it is generally centrally disposed over the chassis to a second loading/unloading position which is forward of the first in-use position, with the second position raised and forward of the first position. The seat may have an intermediate position between the first in-use position and the second loading/unloading position, which is forward and raised from the first in-use position, and the second loading/unloading position is forward and raised from the intermediate position, and the seat is preferably fully functional in the intermediate position. The mounting arrangement suitably comprises a four bar linkage configured such that the seat automatically raises as it moves forward from the first position to the second position.

Preferably, the seat remains at a substantially constant angle throughout the movement.

The seat preferably remains substantially horizontal.

The loading/unloading position is preferably such that there is little or no interference to entry to or exit from the chair, by the front wheel(s) of the vehicle.

The vehicle is preferably adapted for indoor and outdoor use.

Advantageously, the vehicle comprises at least one battery powered electric motor arranged to drive at least one of the wheels of the vehicle in an indoor environment, and an internal combustion motor arranged to drive at least one of the wheels of the vehicle via a motor-generator in an outdoor environment and to charge the batteries of the electric motor(s) during the outdoor operation.

In accordance with a second aspect of the present invention, there is provided a vehicle for transporting a person and having a seat supported from a support frame and four wheels cantilevered from the support frame and which enable the vehicle to move along a ground surface, wherein the wheels have a track width and a wheelbase length that are adjustable when the vehicle is occupied, whether the vehicle is substantially stationary or in motion, and wherein the seat moves towards the ground surface as the wheelbase length and the track width are increased.

The wheelbase length and the track width of the vehicle are preferably adjustable concurrently.

Suitably, the wheelbase length and track width are adjustable between a first minimum size and a second maximum size.

Preferably, the support frame is lower to the ground surface when the wheelbase length and track width are the second maximum size than when the wheelbase length and track width are the first minimum size. Alternatively, or in addition, the seat may be lower to the support frame when the wheelbase length and track width are the second maximum size than when the wheelbase length and track width are the first minimum size.

The vehicle is preferably adapted for indoor and outdoor use. The vehicle may be a personal mobility vehicle, but could be a different type of vehicle such as a golf cart for example.

The vehicle of the second aspect may have any one or more features outlined in relation to the first aspect above.

The invention consists in the foregoing and also envisages constructions of which the following gives examples only.

BRIEF DESCRIPTION OF THE DRAWINGS

Preferred forms of the invention are described with reference to the accompanying drawings, in which:

FIG. 1c is a schematic side view of an occupant using the vehicle with a chassis in the configuration of FIG. 1a;

DETAILED DESCRIPTION OF PREFERRED EMBODIMENTS

Figure 1A:
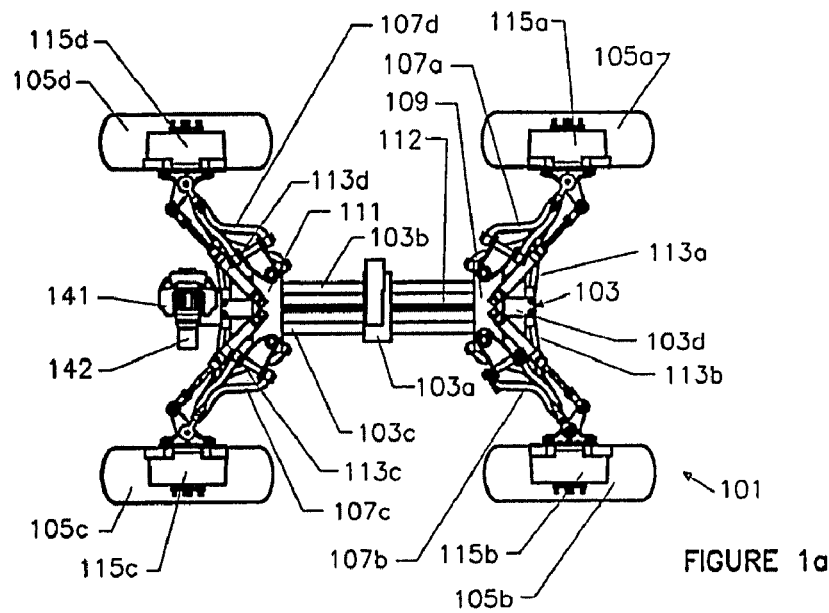
FIG. 1a is a plan view of a chassis of a first preferred embodiment vehicle in an expanded configuration.

FIGS. 1a-1c, 2a-2c, and 3a-3c show three preferred embodiment mobility vehicles, indicated generally by reference numeral 101, 201, and 301 respectively. The features and operation of each are the same, but three versions are shown to show that the vehicles can be provided in different sizes. As the features and operation of each version are the same, only the first version 101 will be described. Like reference numerals are used to indicate like parts in FIGS. 2 and 3, with the addition of 100 and 200 respectively.

The vehicle 101 includes a chassis having a chassis or support frame indicated generally by reference numeral 103, which chassis is supported above the ground by cantilevered wheels 105a, 105b, 105c, and 105d. In the embodiment shown, the chassis frame 103 includes two bars 103b, 103c which are held in a spaced apart configuration by a chassis support 103a which, in the embodiment shown, corresponds in position to an approximate central portion of the chassis. The chassis also includes arms 107a, 107b, 107c, and 107d which are operatively connected to respective wheels. The ends of arms 107a, 107b distal the wheels 105a, 105b are pivotally connected (about a generally vertical pivot axis) to a support block 109, which support block is slidably mounted on the chassis bars 103b, 103c. Similarly, the ends of arms 107c, 107d distal the wheels 105c, 105d are pivotally connected (about a generally vertical pivot axis) to a support block 111, which support block is slidably mounted on the chassis bars 103b, 103 c.

The support blocks 109, 111 are moveable toward and away from one another. In the embodiment shown, a ball screw 112 or the like extends through the chassis support 103a and through threaded apertures (not shown) in the support blocks 109, 111. When the ball screw 112 is rotated in one direction such as by an electric motor or the like, the support blocks 109, 111 are moved apart and the wheels expand apart. When the ball screw 112 is rotated in the other direction, the support blocks 109, 111 are moved closer together and the wheels move towards one another.

A block 103d is provided at each end of the chassis frame, and is fixed relative to the chassis bars 103b, 103c and chassis support 103a. A linkage member 113a, 113b, 113c, and 113d is pivotally connected to a respective arm 107a, 107b, 107c, and 107d, and to a support block 103d.

Figure 1B:
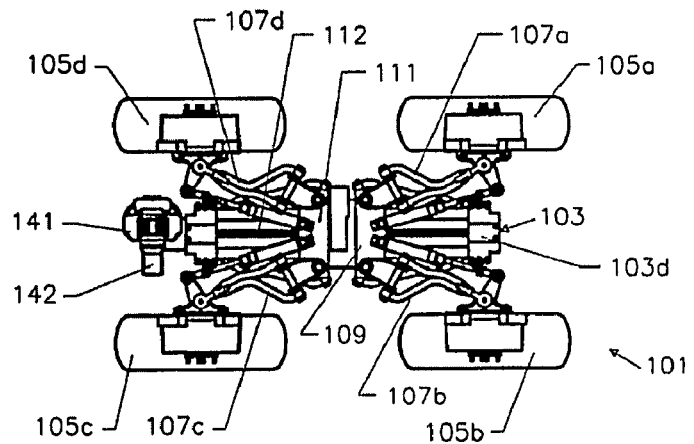
FIG. 1b is a plan view of the chassis of FIG. 1a in a retracted or collapsed configuration.

Due to the configuration of the chassis bars 103b, 103c, chassis support 103a, and blocks 103d; arms 107a, 107b, 107c, 107d; linkage members 113a, 113b, 113c, 113d; and support blocks 109, 111; the chassis is movable between a first, retracted or collapsed configuration shown in FIG. 1b and a second, expanded or spread configuration shown in FIG. 1a. In the spread configuration, the wheelbase length (the distance between the points of contact of the front and back wheels of the vehicle and the ground) and the track width (the distance between a wheel on one side of a vehicle and the corresponding wheel on the other side of the vehicle) are greater than in the collapsed configuration. The collapsed configuration is particularly useful for indoor use, as the vehicle is shorter and narrower. That makes the vehicle easier to navigate through doorways, and also makes the vehicle easy to store and transport. The expanded configuration provides a wider and longer footprint, which improves the stability of the vehicle especially for outdoor use. In that configuration, the vehicle will be more stable while travelling over a curb, or while travelling at higher speed, for example.

The wheelbase length and track width of the vehicle can be changed or adjusted while the vehicle is in motion as well as when the vehicle is stationary. That is, the wheelbase length and track width can be adjusted either while the vehicle has a linear velocity along the ground surface, or while the vehicle has no linear velocity along the ground surface. As will be described below, the wheels are independently or differently steerable, and optionally also independently or differently drivable.

In the embodiment shown, an electric motor 115a, 115b, 115c, and 115d is provided within each wheel, and effectively forms the hub for each wheel. Each motor can preferably be driven in a forward and rearward direction to drive the associated wheel in a forward and rearward direction, most preferably regardless of the direction that the other wheels are rotating. An anti-skid controller is preferably provided for each wheel. Each wheel preferably also has a pneumatic tyre suitable to provide grip in muddy or wet conditions. A controller is preferably configured to direct drive to any wheel that has not lost traction, if one or more of the wheels do lose traction. So that the wheels are suitable for multiple applications, they are larger than the small castors that would generally be used in an electric wheelchair. That provides improved ground clearance, irrespective of the configuration of the chassis.

Other sources of power could be used to drive the wheels, such as hydraulic motors for example.

The vehicle of FIG. 2 differs from that of FIG. 1 in that it has a narrower track width and shorter wheelbase length. The vehicle of FIG. 3 differs from that of FIG. 2 in that it again has a narrower track width and shorter wheelbase length.

Figure 4:
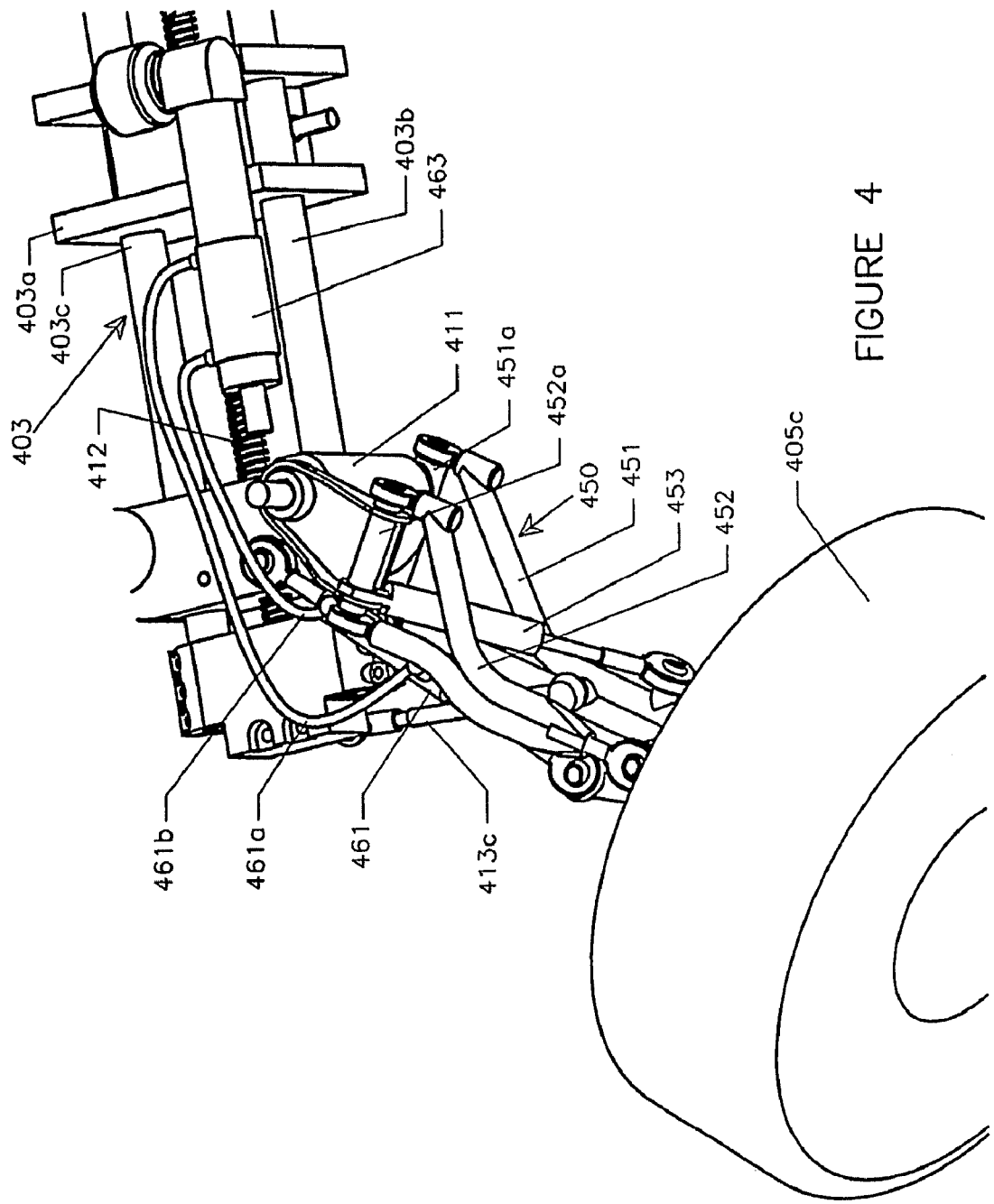
FIG. 4 is side perspective view of one end of a preferred embodiment chassis.
Figure 5:
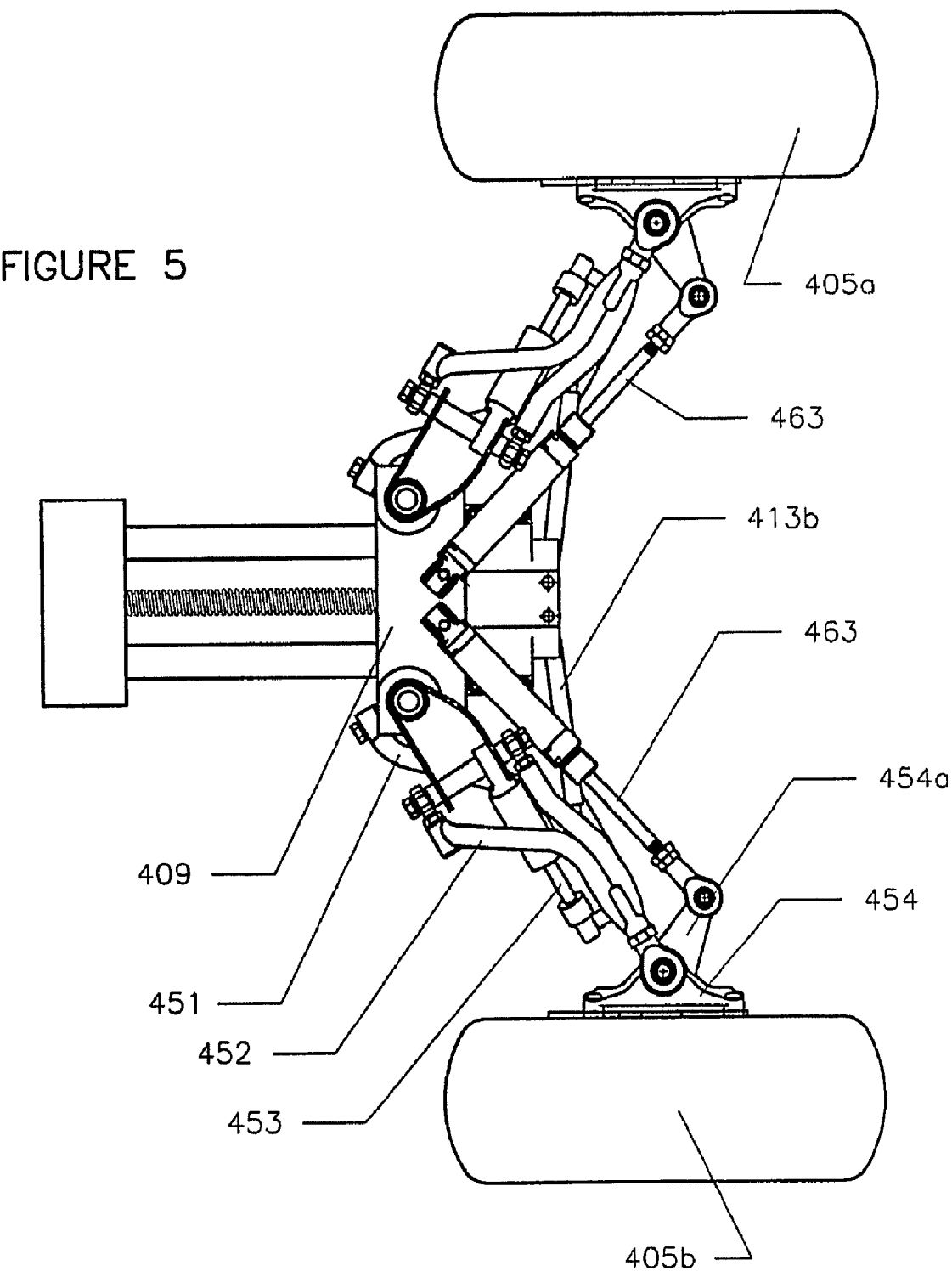
FIG. 5 is an overhead perspective view of one end of a preferred embodiment chassis, with the chassis in an expanded configuration.
Figure 6:
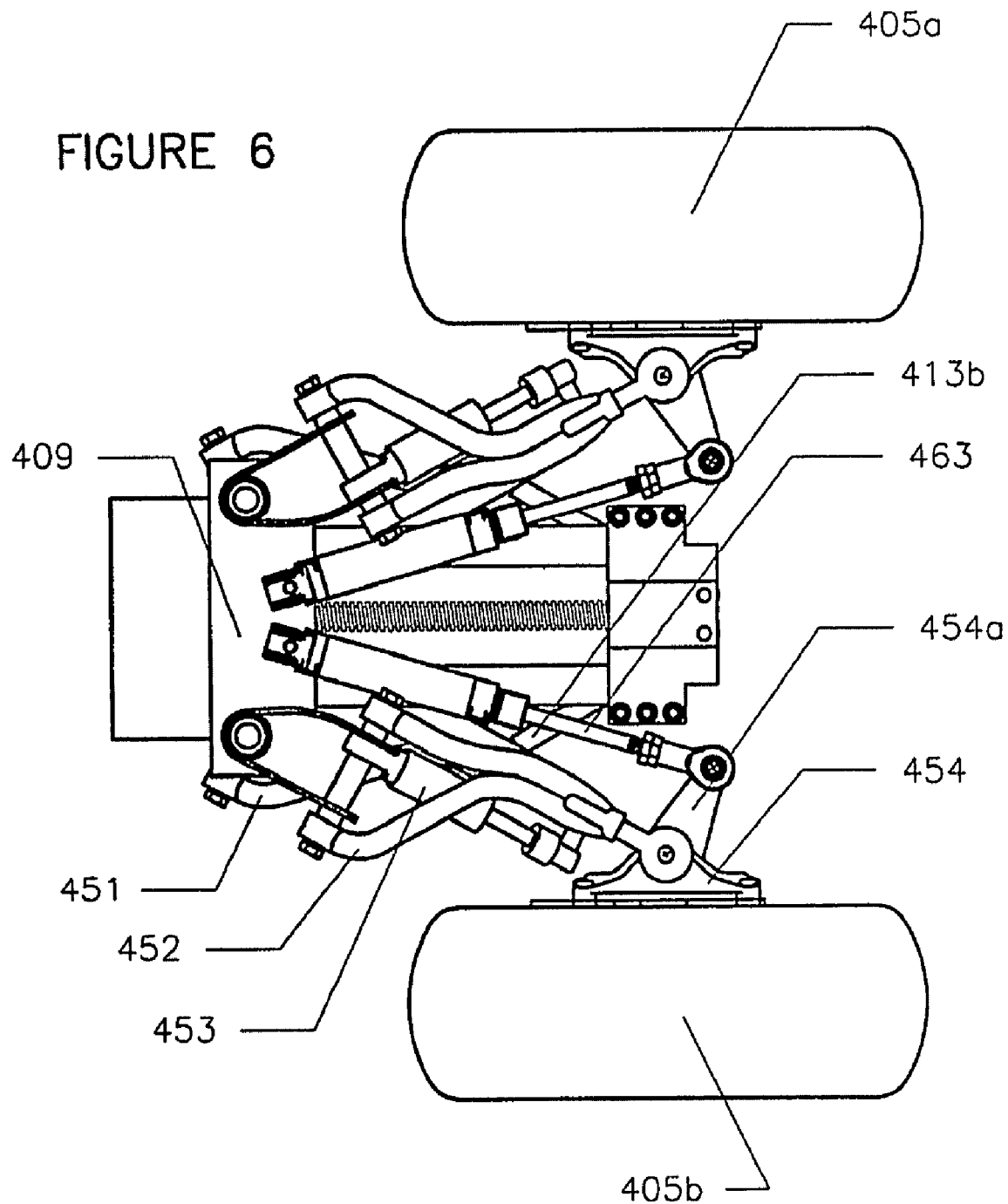
FIG. 6 is an overhead perspective view similar to FIG. 5, with the chassis in a retracted or collapsed configuration.

FIGS. 4 to 6 show details of an alternative preferred embodiment vehicle. Unless described below, the features should be considered the same as above and like reference numerals are used to indicate like parts to FIG. 1 with the addition of 300. In this embodiment, each of the arms 107a, 107b, 107c, and 107d is replaced with an arrangement indicated generally by reference numeral 450. The arrangement comprises two vertically spaced arms 451, 452, each of which is pivoted about a generally horizontal axis to a cross member 451a, 452a. The cross members 451a, 452a are pivoted about a generally vertical axis to the support block 411. The cross members 451a, 451b, and thereby the arms 451, 452, are configured to turn together relative to the support block 411 about the generally vertical axis. The opposite ends of the arms 451, 452 are pivotally mounted to a wheel support 454 (FIG. 5). A hydraulic cylinder and piston 453 is connected between a part of the lower arm 451 at the wheel end and the cross member 452a. That configuration provides a suspension arrangement for the wheel 405c. A similar suspension arrangement will be provided for each of the wheels.

By adjusting length of the ram of cylinder 453, the vertical position of the respective wheel relative to the chassis frame 403 can be adjusted.

In some configurations, it is desirable that as the chassis is moved to the second, expanded configuration, the chassis frame moves toward the ground surface to lower the centre of gravity of the vehicle. That further enhances the stability of the vehicle in the expanded configuration of the chassis, and can be achieved by adjusting the cylinders 453 for example. A controller may be set up to achieve that automatically upon expansion of the chassis.

The vehicle is preferably provided with one or more sensors to detect the angle of the vehicle's chassis. A control system is preferably configured to automatically adjust each cylinder 453 as required to shift the centre of gravity of the vehicle back towards the middle of the chassis if the vehicle is on a non-horizontal angle. For example, if the vehicle encounters an uphill gradient while travelling forward, the control system will raise the rear end of the chassis relative to the rear wheels. Similarly, the control system will preferably adjust the vertical position of the side wheels if the vehicle encounters a side slope. This arrangement will enhance the stability of the vehicle for safety, and will also improve driver comfort.

The control system is preferably configured such that if the chassis is fully adjusted to cope with an incline and the occupant pushes the vehicle further than a pre-defined safety limit, the vehicle will provide a warning and prevent the wheels from driving further. The vehicle may enter a safety mode in which the wheels can only be "jogged" (ie operated intermittently) to manoeuvre out of difficulty.

It will be appreciated that the suspension arrangement can be used in the embodiments of FIGS. 1 to 3. Other suspension arrangements could be used in the vehicles, but it is preferred that each wheel has independent suspension.

FIGS. 4 to 6 also show details of a preferred embodiment steering arrangement which provides independent steering of each wheel. A hydraulic cylinder and piston 463 has one end pivoted to part of the sliding support block 411, and the other end pivoted to an extension 454a of the wheel support 454. By adjusting the length of the cylinder and piston 463, the wheel is turned about the pivot point intersection of the arms 451, 452 and the wheel support 454. A similar arrangement will generally be provided for each wheel. It should be noted that this steering mechanism is not affected significantly by the expansion or contraction of the chassis; chassis adjustments while cornering will not result in dangerous unwanted steering effects.

In the embodiment shown, the cylinder 463 is a slave cylinder, and is actuated by a master cylinder 461 via tubes 461a, 461b. Fluid entering cylinder 463 through tube 461b extends the piston from the slave cylinder, whereas fluid entering cylinder 463 through 461a retracts the piston into the slave cylinder.

Figure 7:
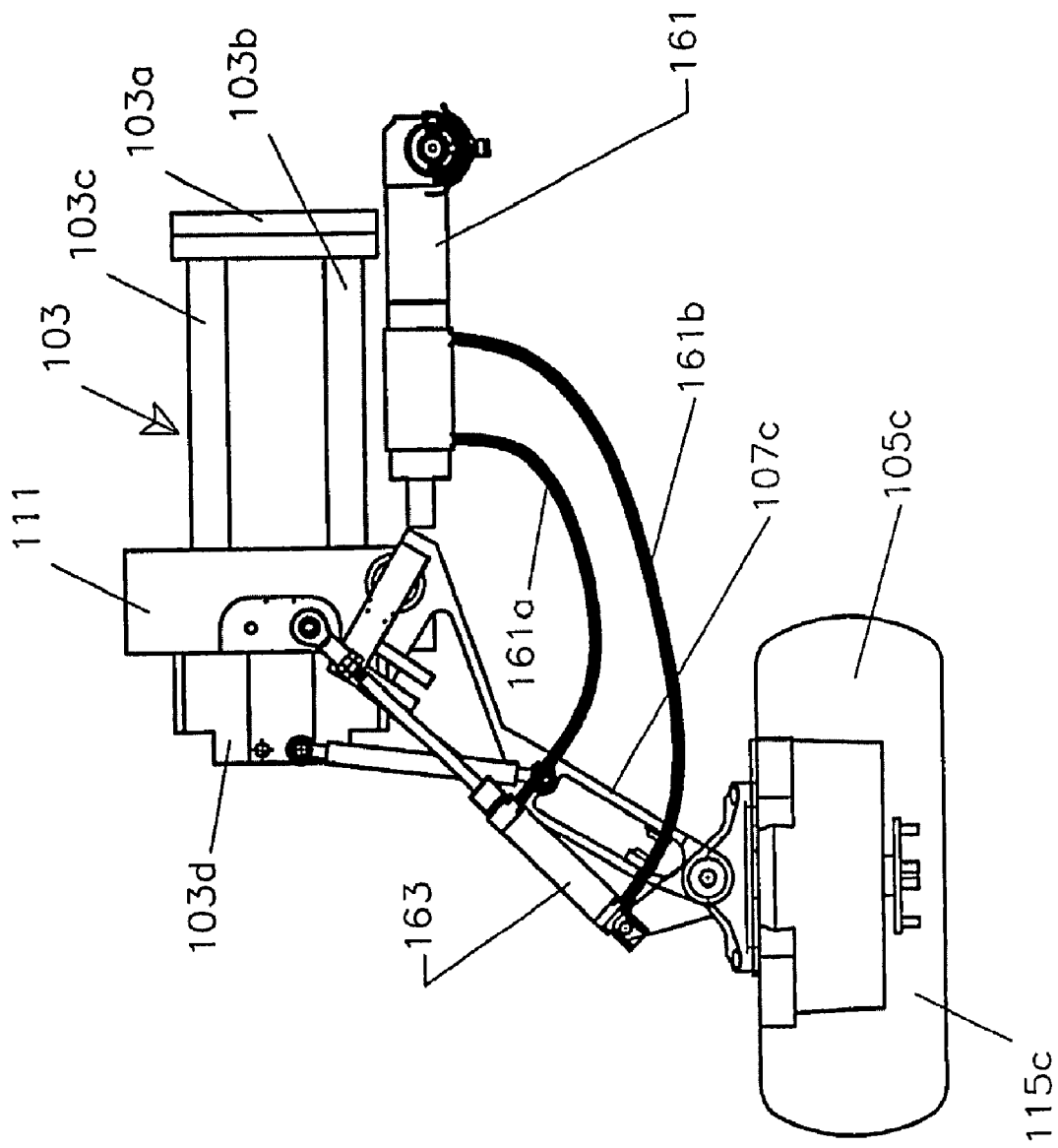
FIG. 7 is a plan view of an arrangement for steering one of the wheels of the embodiment of FIG. 1.
Figure 8:
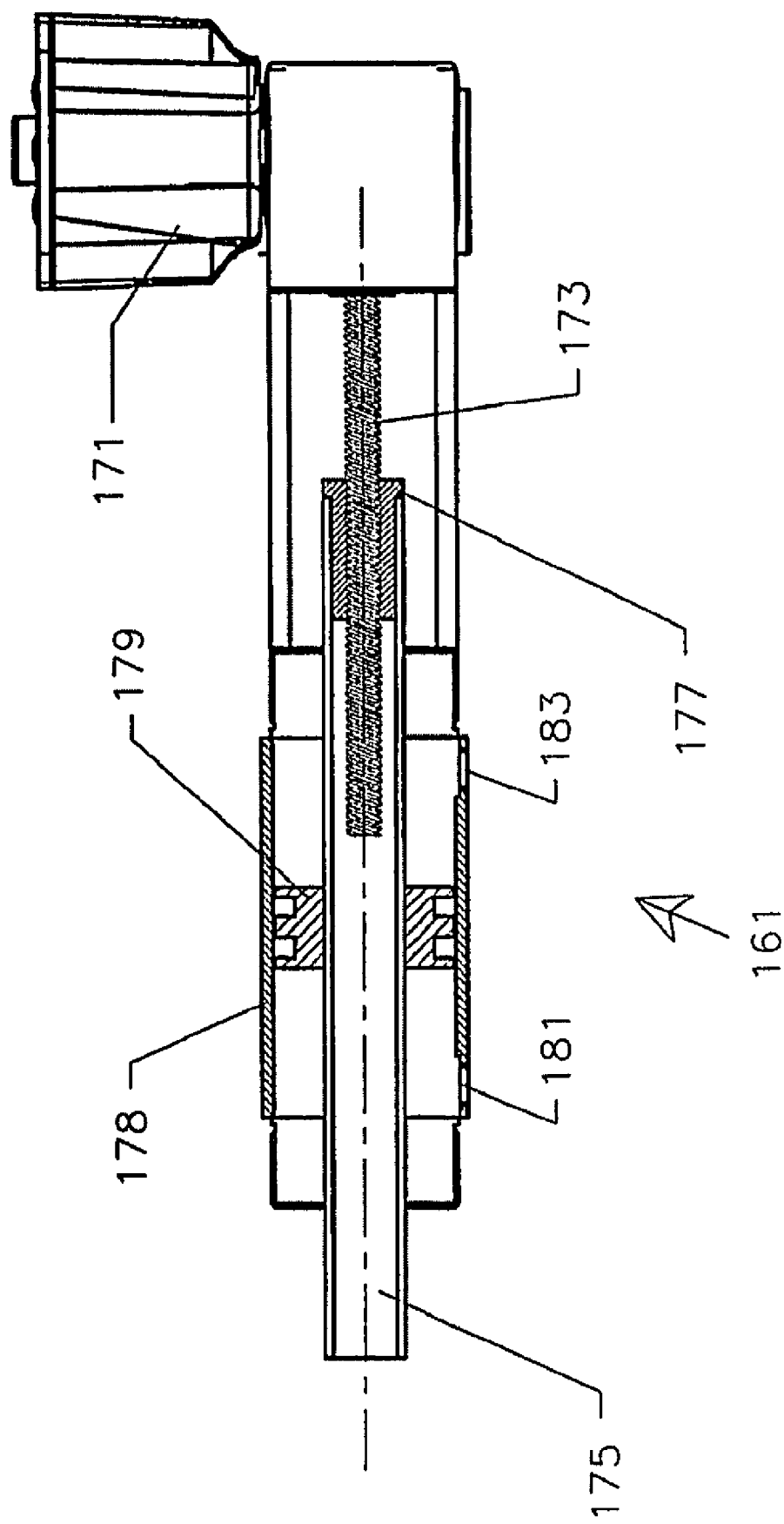
FIG. 8 shows the master cylinder of the arrangement of FIG. 7 in detail.

FIGS. 7 and 8 show details of a similar system for the vehicles of FIGS. 1 to 3. A slave cylinder and piston 163 is actuated by a master cylinder 161 via tubes 161a, 161b. The master cylinder will generally be mounted to part of the chassis. The master cylinder is shown in detail in FIG. 8, and includes a dc electric motor 171 with feedback, which rotates a ball screw 173 or the like. The ball screw is threaded through a nut 177 that is fixed to a piston rod 175 which carries a piston 179 within a hydraulic cylinder 178. When the ball screw 173 is driven in one direction, the piston moves towards port 183 and pushes hydraulic fluid through one of the tubes to actuate the slave cylinder. When the ball screw 173 is driven in the opposite direction, the piston moves towards port 181 and pushes hydraulic fluid through the other tube to actuate the slave cylinder in the opposite direction.

A master/slave cylinder configuration is preferably provided for each wheel. Other configurations can be used, including electric linear actuators, but it is preferred that each of the wheels of the vehicle has independent steering.

By providing independent all wheel steering, and optionally in combination with independent all wheel drive, a number of configurations as shown in FIG. 9 can be achieved. FIG. 9a shows a configuration in which two wheels 105a, 105b (either front wheels or rear wheels) are turned in the same direction, for standard cornering. Two or four of the wheels can be driven in the same direction to move the vehicle.

Figure 9A:
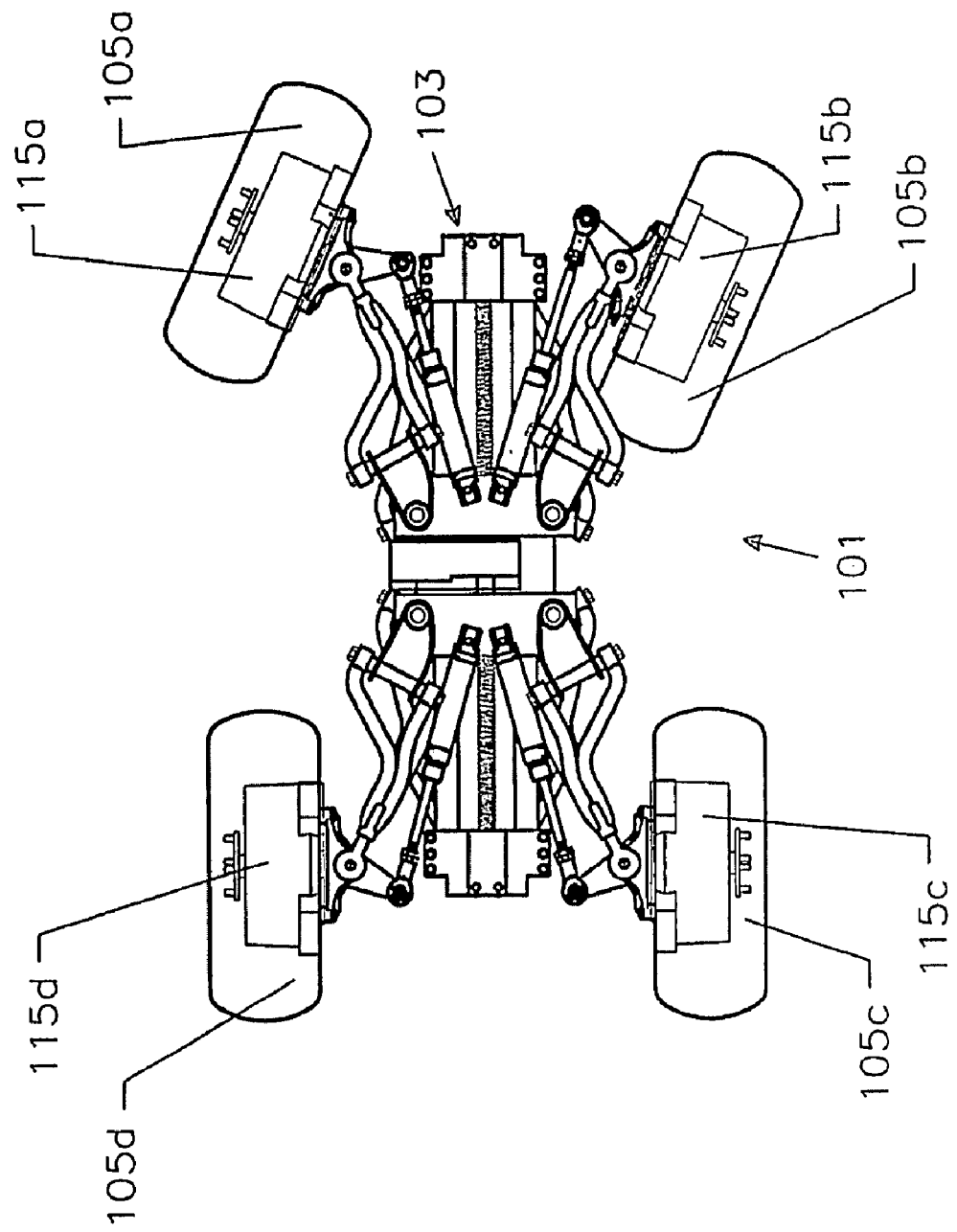
FIG. 9a is a plan view of a chassis similar to FIG. 1a with two wheels being steered.
Figure 9B:
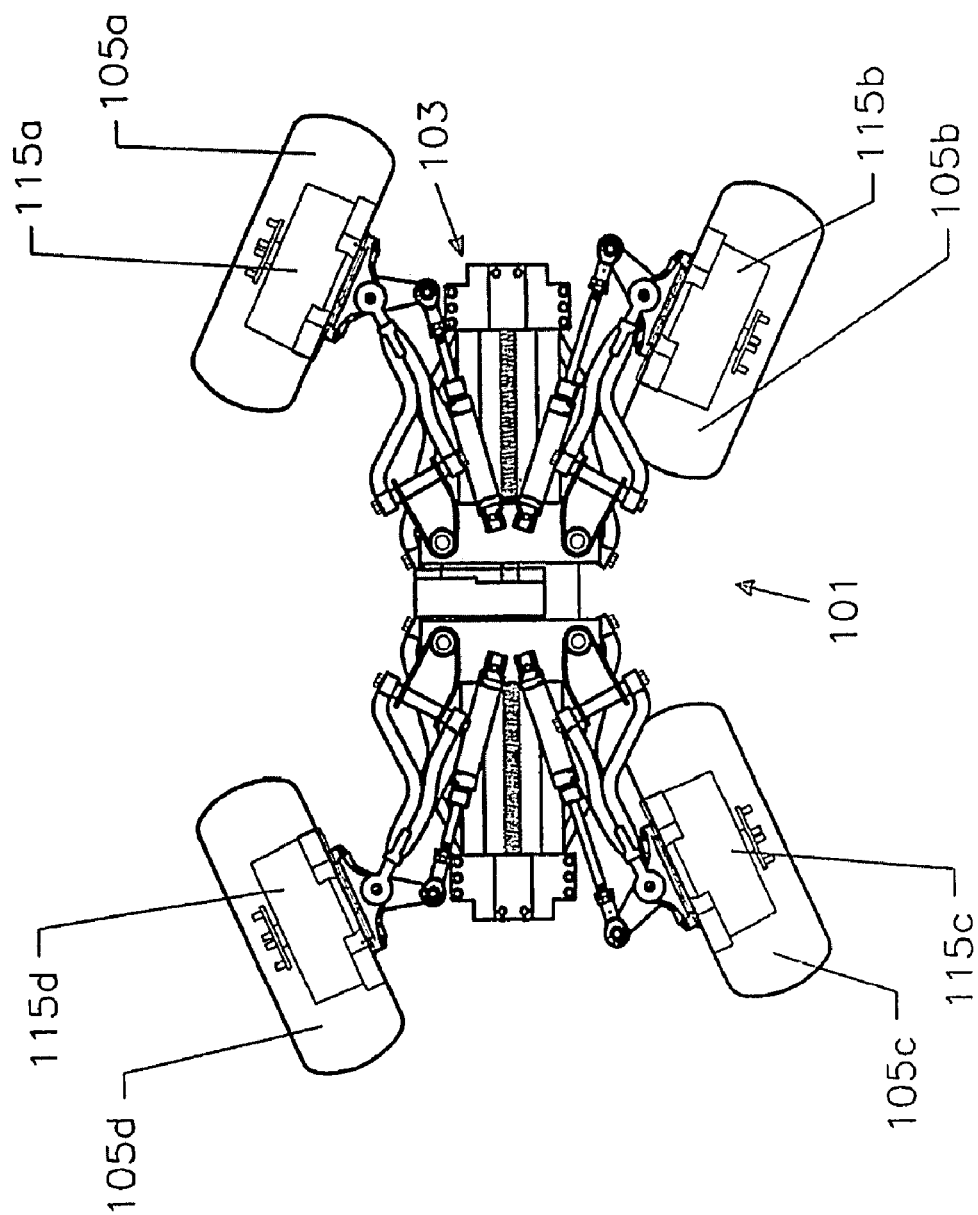
FIG. 9b is a plan view of a chassis similar to FIG. 1a with four wheels being steered for negotiating tight corners.

FIG. 9b shows a configuration for negotiating tighter turns, in which two wheels 105a, 105b are turned in one direction, and the other two wheels 105c, 105d are turned in the opposite direction. Two or four of the wheels can be driven in the same direction to move the vehicle.

Figure 9C:
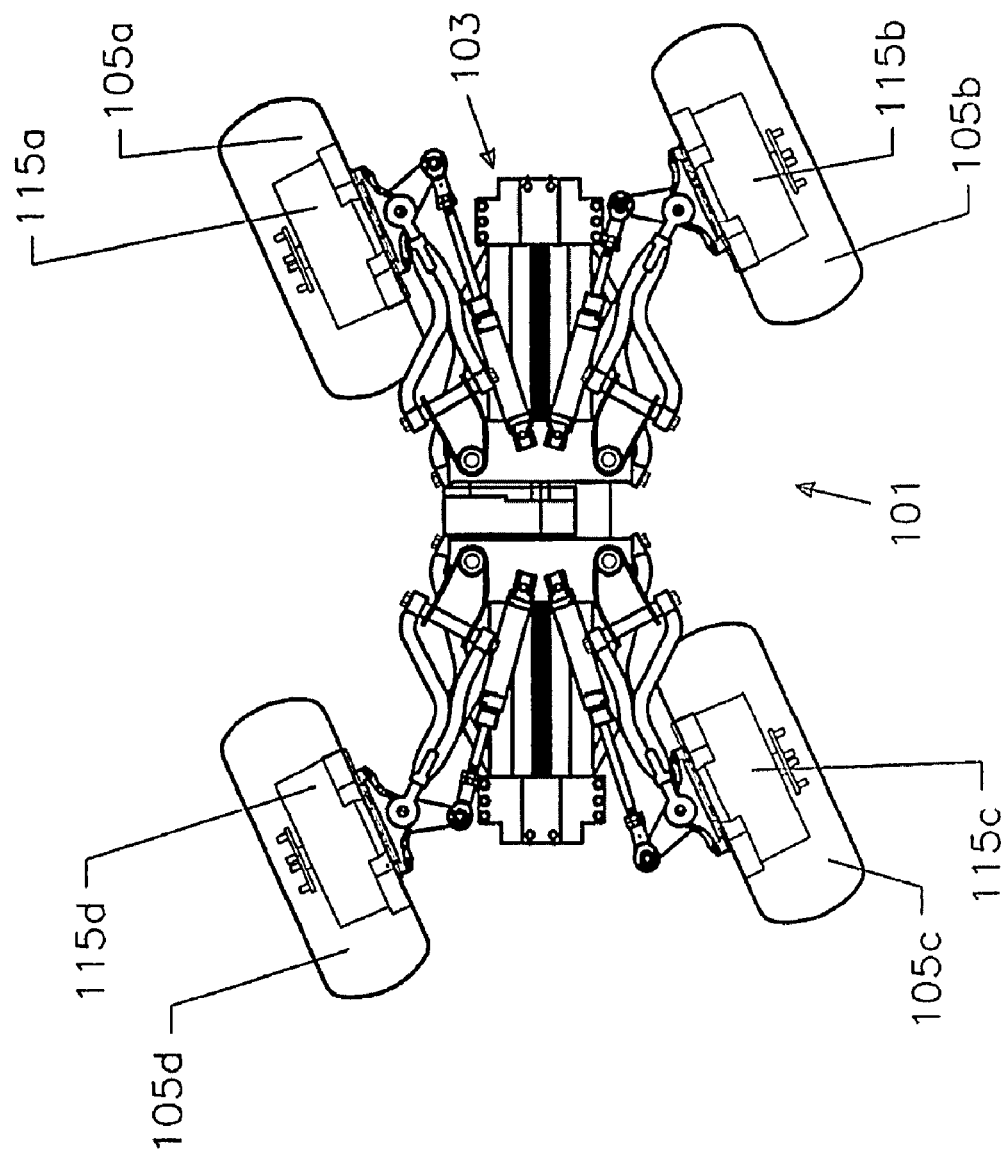
FIG. 9c is a plan view of a chassis similar to FIG. 1a within four wheels being steered in a "crab" configuration.

FIG. 9c shows a "crab" configuration for translational movement of the vehicle, in which all of the wheels are turned in the same direction. This allows the vehicle to be moved in a generally sideways manner. Two or four of the wheels (but preferably four) can be driven in the same direction to move the vehicle.

Figure 9D:
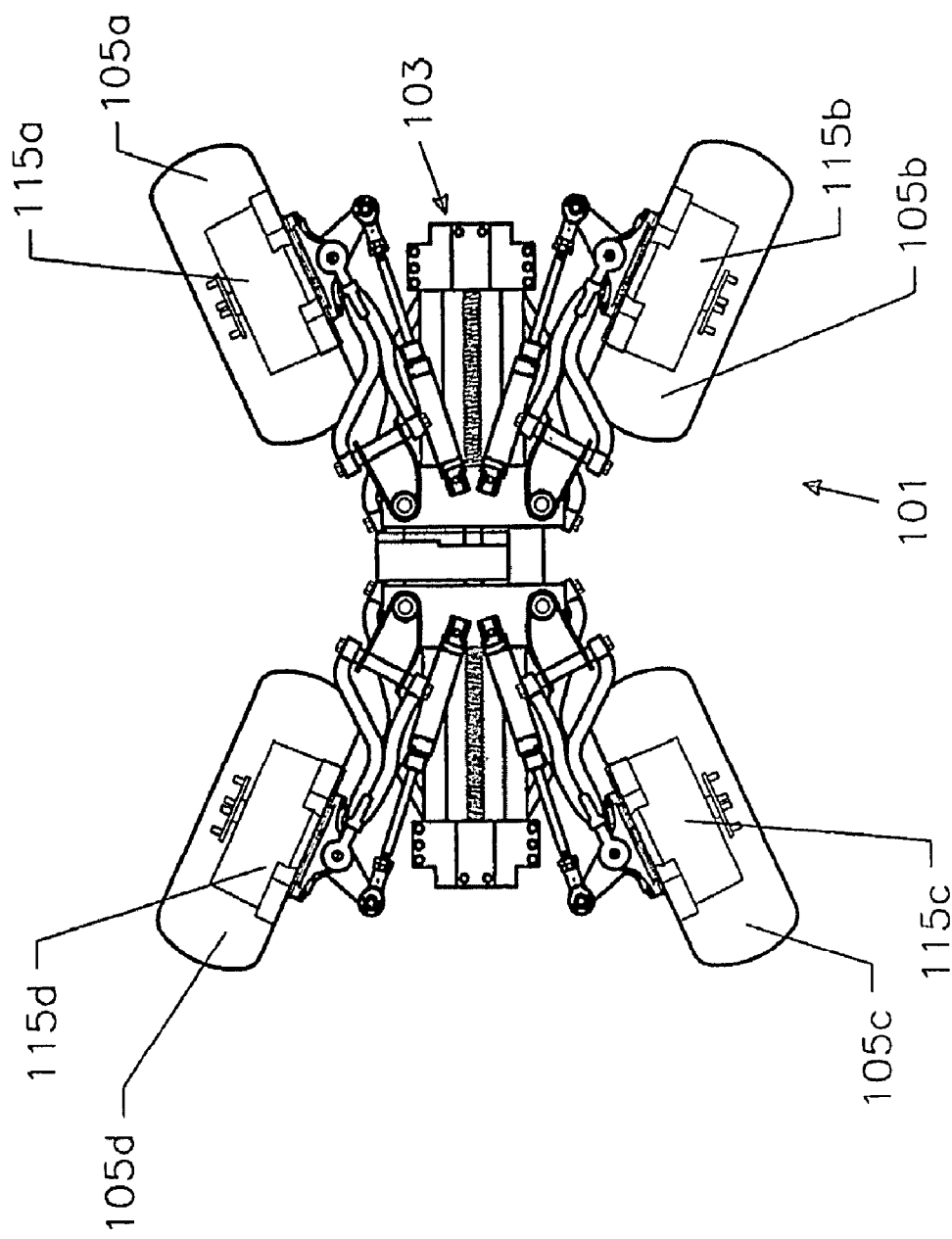
FIG. 9d is a plan view of a chassis similar to FIG. 1a with the chassis in a retracted or collapsed configuration and the wheels angled for moving the chassis to an expanded configuration while the vehicle is stationary.
Figure 9E:
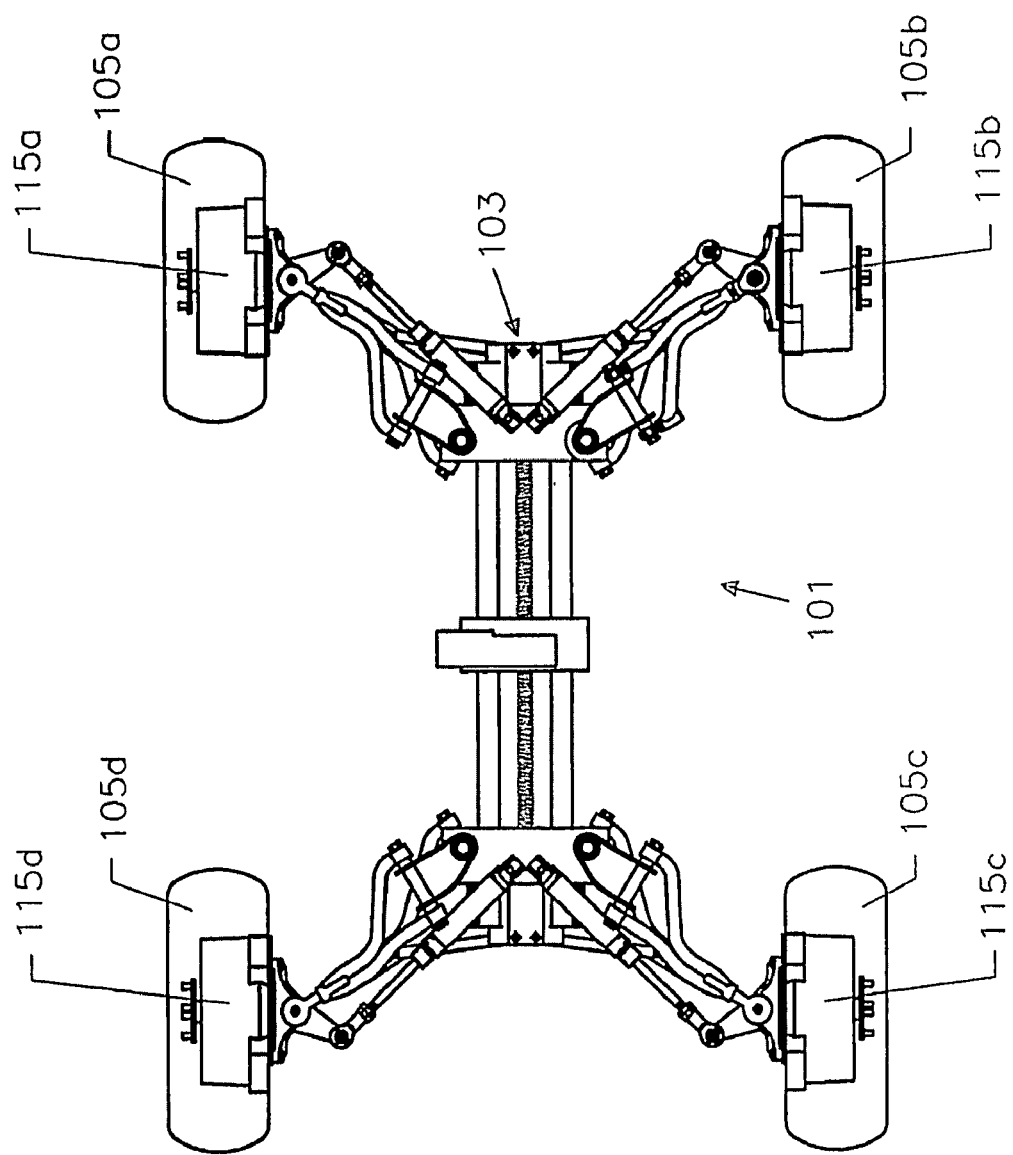
FIG. 9e is a plan view of a chassis similar to FIG. 1a following the expansion of the chassis and straightening of the wheels.

FIG. 9d shows a configuration in which all of the wheels are directed outwardly. That is, the portions of all of the wheels distal from a central portion of the chassis are directed outwardly. The chassis is in the retracted or collapsed configuration. This is a particularly useful wheel arrangement if the chassis is to be adjusted from the retracted or collapsed configuration to the expanded configuration while the vehicle is stationary. FIG. 9e shows the chassis of the vehicle once it has been moved from the retracted or collapsed configuration to the expanded configuration, and the wheels have accordingly adjusted in position. As the chassis is expanded, the wheels turn inward as well as moving outward (both in terms of wheelbase and track), to ultimately reach the parallel arrangement shown in FIG. 9e.

The wheels located toward one end of the vehicle are preferably driven in an opposite direction to the wheels located toward the other end of the vehicle during expansion of the chassis. Alternatively, the wheels could freewheel, and the chassis could be expanded or contracted solely via movement of the support blocks 109, 111 using the ball screw 112 (or via an alternative mechanism). In the most preferred embodiment, the adjustment will be via the moving support blocks and opposite drive of the wheels.

Each wheel follows an arcuate or curved path during that movement. The result is that, although the wheels remain in contact with the ground surface during adjustment, damage to the ground and stress on the chassis components are both minimised as there is little or no scuffing of the wheels against the ground. This movement minimises damage to dirt tracks, internal floor coverings, and the like.

The chassis is preferably fully functional at any intermediate configuration between the retracted and expanded configuration. That is particularly useful if it is temporarily necessary to reduce the track width of the vehicle to fit through a restricted space, as it is not necessary to fully retract the chassis in order to do so.

Figure 9F:
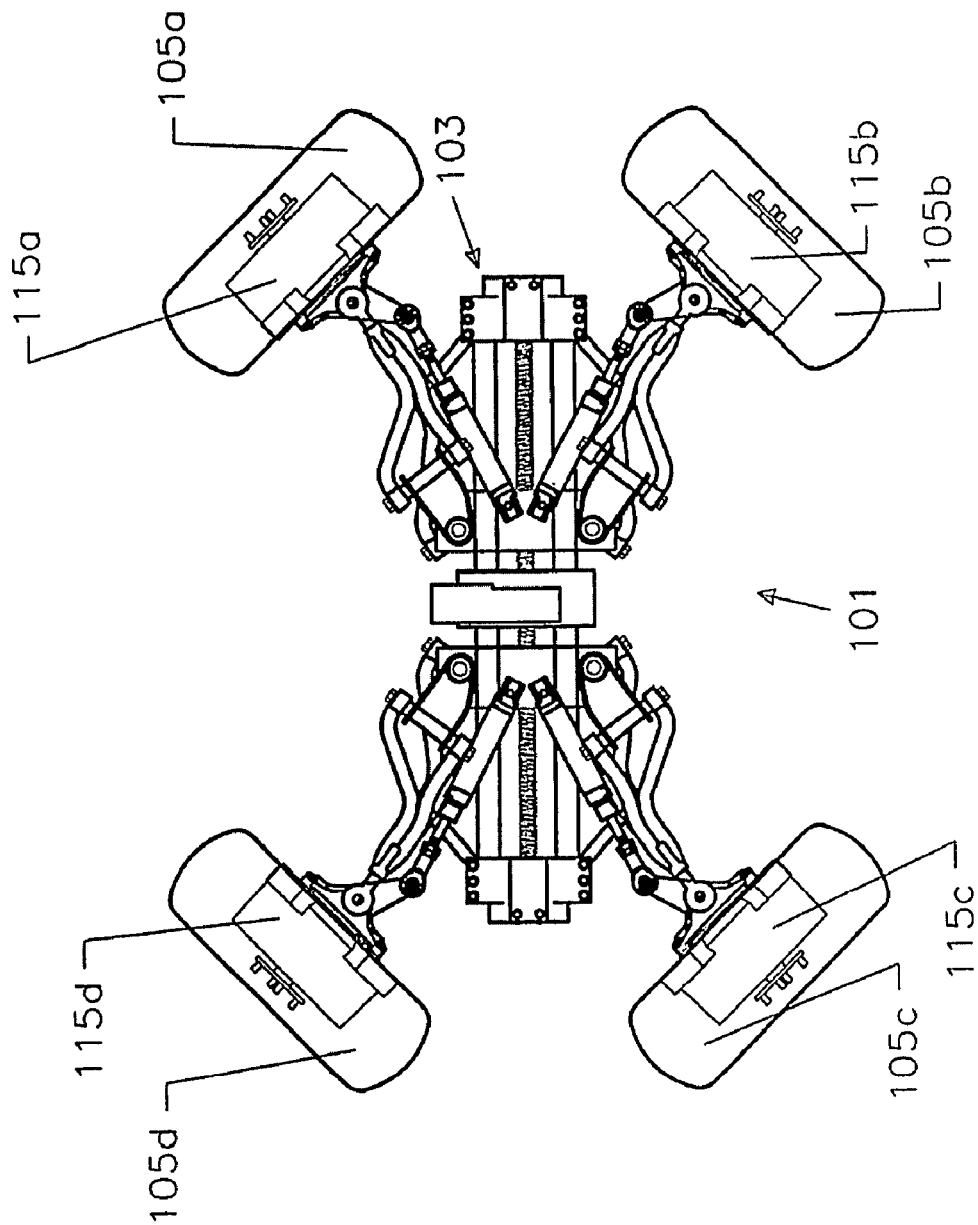
FIG. 9f is a plan view of a chassis similar to FIG. 1a with the wheels in a configuration suitable for rotating the vehicle.

FIG. 9f shows a configuration in which all of the wheels are directed inwardly. That is, the portions of all of the wheels distal from the central portion of the chassis are directed inwardly. This is a useful configuration for when the vehicle needs to be turned in a restricted space. By driving some or all of the wheels in the same rotational direction relative to the chassis (when viewed from the exterior of the respective wheel), such as clockwise, the vehicle can rotate substantially on the spot; that is with little or no linear motion. That is again useful for minimising damage to surrounding ground surface.

It will be appreciated that any of the wheel positions shown in FIGS. 9a, 9b, 9c, 9e, and 9f can be selected when the chassis is either in the expanded configuration or the retracted configuration.

It will be appreciated that one or more controllers will generally be provided, and the controller(s) may be pre-programmed with the pre-defined wheel and chassis configurations shown in FIG. 9, so the wheel and chassis configurations can be readily selected by an occupant, by pressing relevant buttons for example.

Figure 1C:
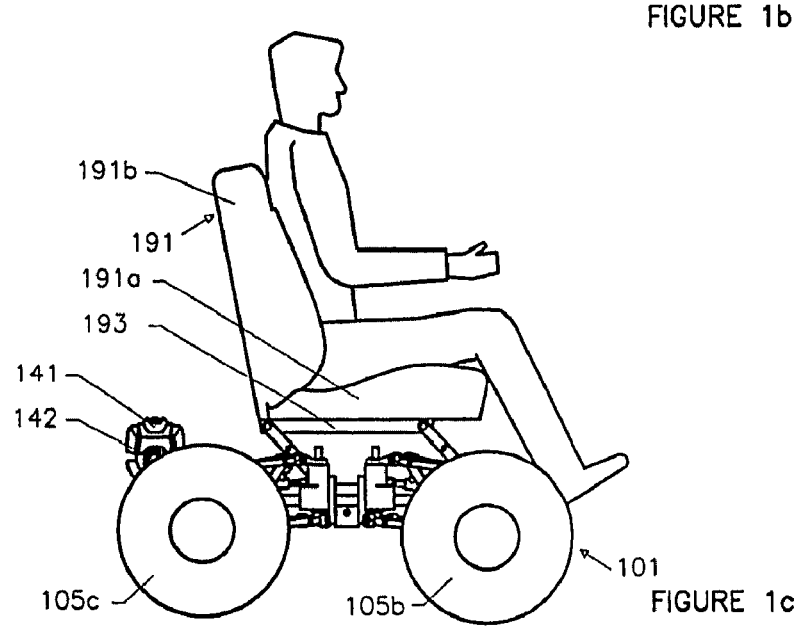
Figure 2A:
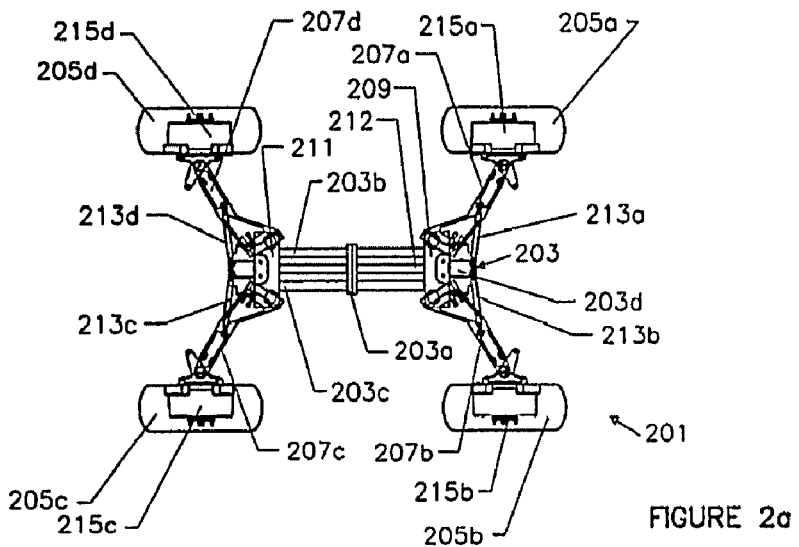
FIG. 2a is a plan view of a chassis of a second preferred embodiment vehicle in an expanded configuration.
Figure 2B:
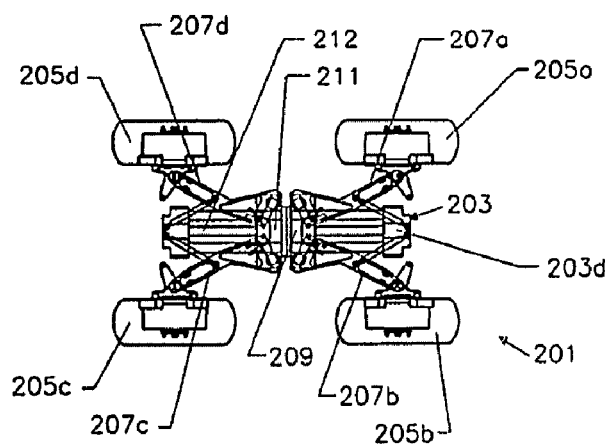
FIG. 2b is a plan view of the chassis of FIG. 2a in a retracted or collapsed configuration.
Figure 2C:
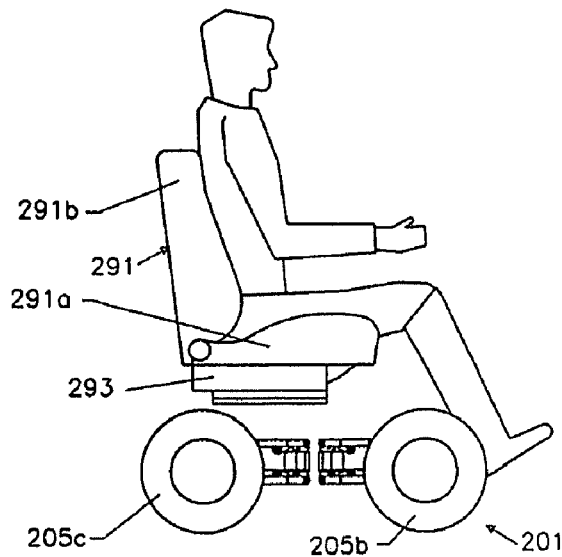
FIG. 2c is a schematic side view of an occupant using the vehicle with the retracted or collapsed chassis of FIG. 2b.
Figure 3A:
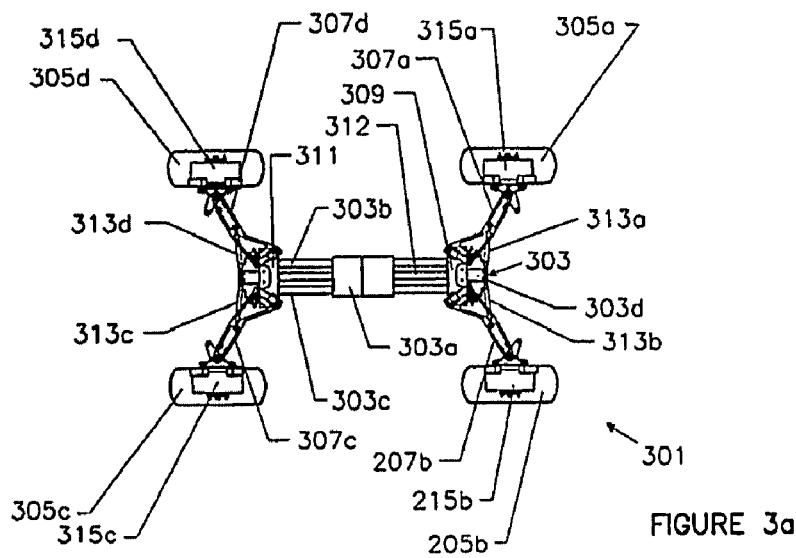
FIG. 3a is a plan view of a chassis of a third preferred embodiment vehicle in an expanded configuration.
Figure 3B:
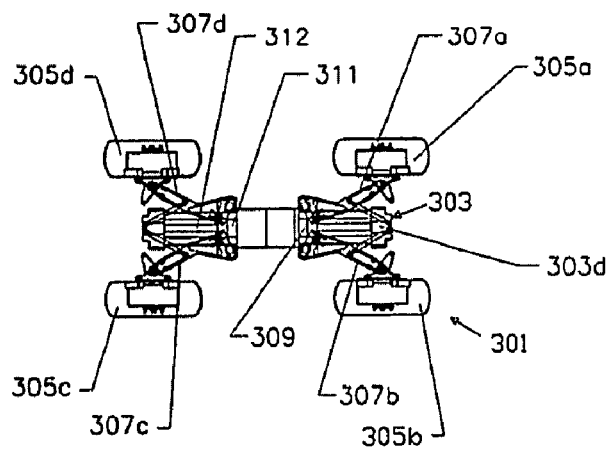
FIG. 3b is a plan view of the chassis of FIG. 3a in a retracted or collapsed configuration.
Figure 3C:
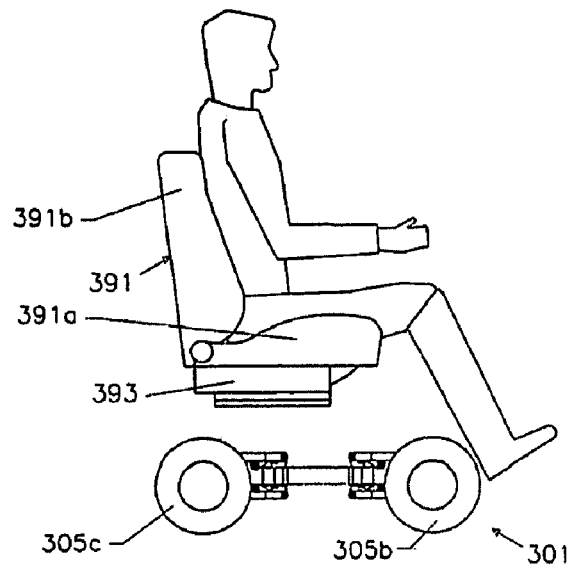
FIG. 3c is a schematic side view of an occupant using the vehicle with the retracted or collapsed chassis of FIG. 3b.

As can be seen schematically in FIG. 1c, a seat 191 for carrying an occupant is supported above the chassis. In the embodiment shown, the seat has a seat portion 191a and a back portion 191b, which may be reclinable relative to the seat portion if desired. The seat portion 191a is mounted on a seat support 193. FIG. 10 schematically shows a preferred arrangement for mounting the seat above the chassis. The seat can be mounted to a seat support 193 having an integral leg rest portion 194 (which may be padded for comfort) and a foot rest portion 195. The seat support 193 is part of a four bar linkage, comprising the seat support 193, the leg rest portion 194, a first member 196 and a second member 197. The leg rest portion 194 is pivoted to a member 194a that is fixed relative to, and may be part of, the chassis 103, and the second member 197 is pivoted to a member 197a that is fixed relative to, and may be part of, the chassis. A hydraulic cylinder and piston 199 is pivoted to the second member 197 and to a member 199a that is fixed relative to, or may be part of, the chassis 103.

By extending the ran, the member 197 is rotated forward about the member 197a, and due to the configuration of the four bar linkage the seat support 193 and thereby the seat is raised and moved forward relative to the chassis 103. By retracting the ram, the member 197 is rotated rearwardly about the member 197a and the seat support 193 and thereby the seat is lowered and moved rearwardly relative to the chassis 103.

Figure 10A:
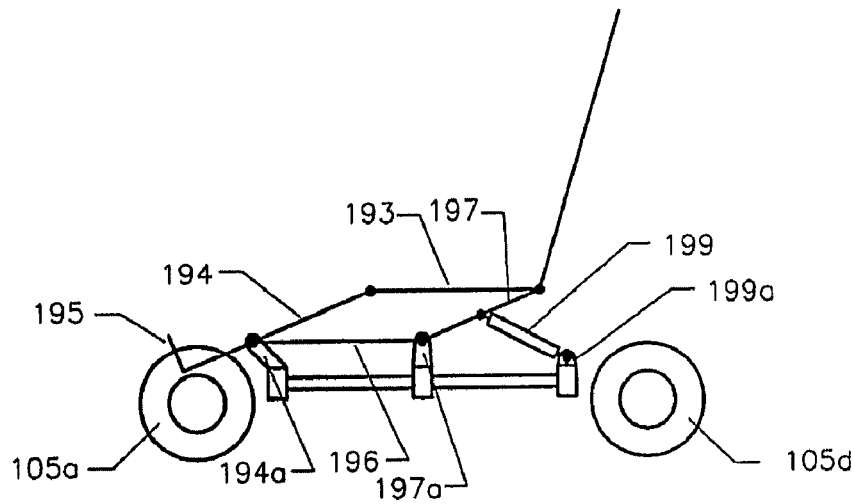
FIG. 10a is a side view of a preferred embodiment vehicle with a seat in a lowered position for outdoor use.
Figure 10B:
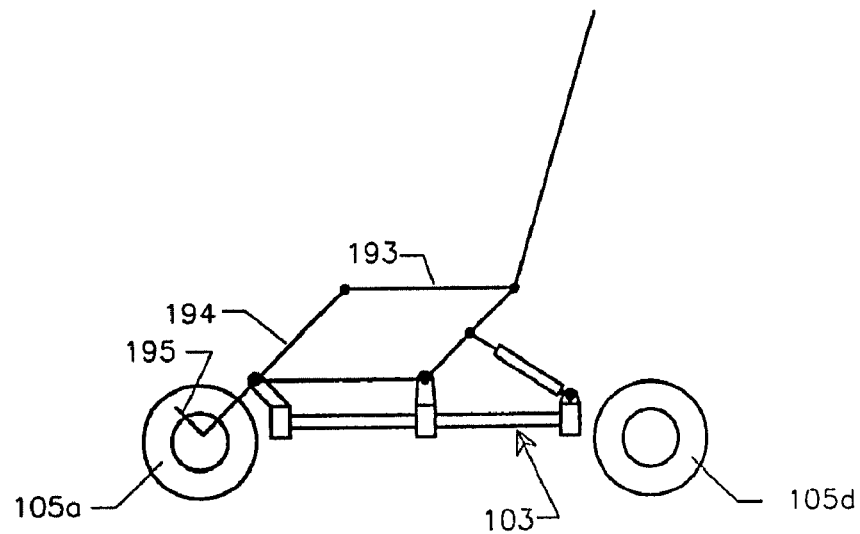
FIG. 10b is a side view of the vehicle of FIG. 10a with the seat in an intermediate position for indoor use.
Figure 10C:
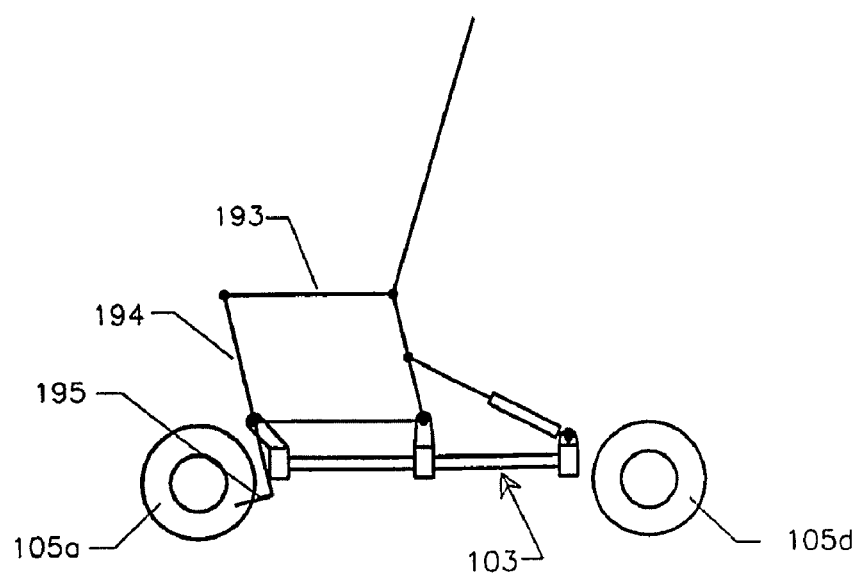
FIG. 10c is a side view of the vehicle of FIG. 10a with the seat in a raised loading/unloading position.

FIG. 10a shows the seat support 193 in its most rearward and lowered position, which provides a low centre of gravity for the seated occupant. As can be seen, the seat is in a generally central position over the chassis. That is useful for higher speed outdoor use. FIG. 10b shows an intermediate position which is particularly useful for indoor use, wherein the seat is raised and more forward relative to the chassis than in the position of FIG. 10a. This position enables the occupant to easily reach shelves aid worktops. FIG. 10c shows a loading/unloading position for the occupant, in which the seat is raised and moved forward relative to the chassis than in the position of FIG. 10b. This enables an occupant to easily enter or exit the chair, and due to the forward position of the seat there will be little or no interference to the entry or exit of the occupant to/from the chair caused by the front wheels.

A control system may be provided which provides the three predetermined positions shown in FIGS. 10a to 10c, so it is simply a matter of pressing a particular button to obtain the desired seat position.

It is preferred that the seat stays at a substantially constant angle throughout the movement as shown. The seat preferably remains substantially horizontal.

Rather than having a seat support 193 the seat itself could form part of the four bar linkage. The leg support and foot rest could be part of the seat. Further, other arrangements could be used that provide the different seat positions.

Figure 11A:
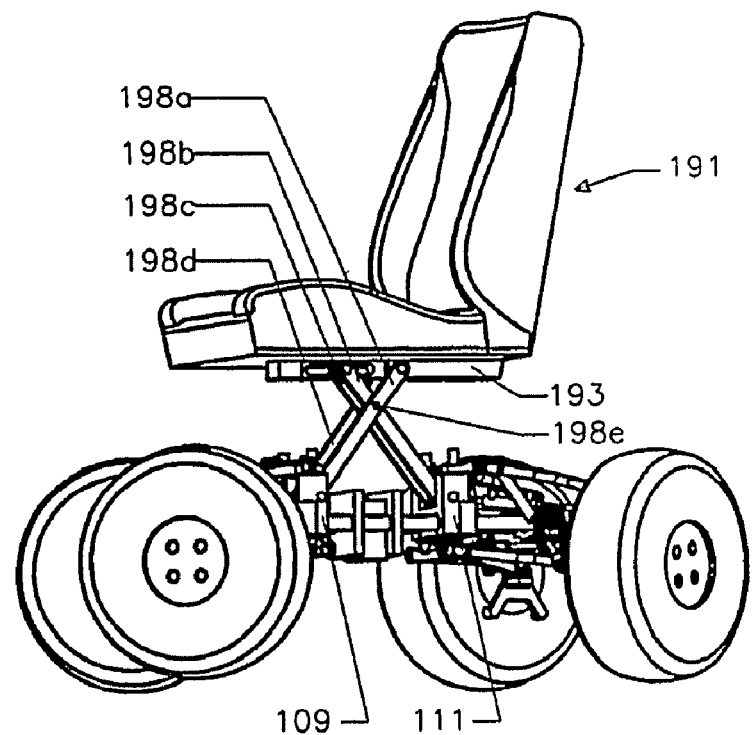
FIG. 11a is a side view of a vehicle in accordance with a further preferred embodiment, with the seat in a raised position and the chassis in a retracted or collapsed configuration.
Figure 11B:
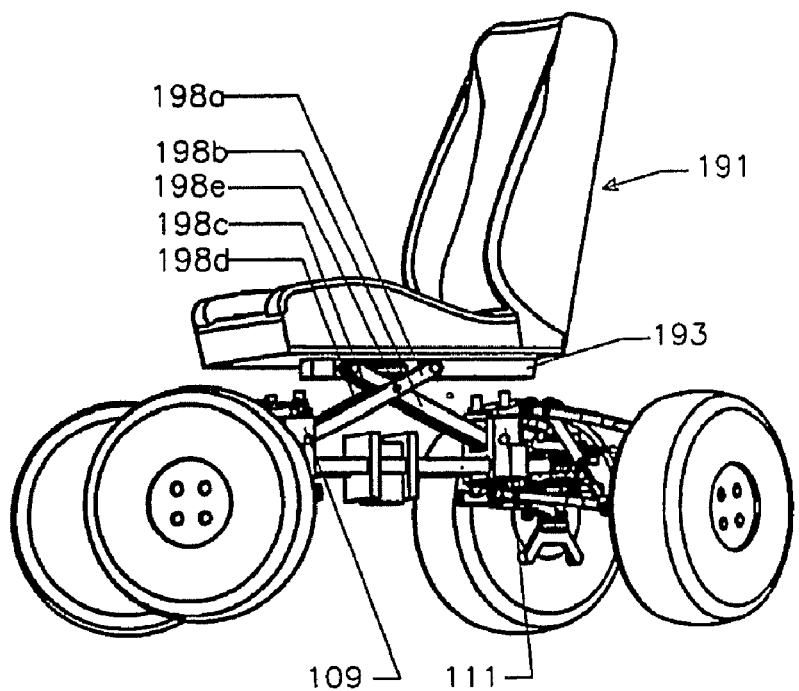
FIG. 11b is a side view of the vehicle of FIG. 11a, but with the seat in a lowered position and the chassis in an expanded configuration.

A second embodiment for connecting the seat 191 to the chassis is shown in FIGS. 11a and 11b. Four bars 198a, 198b, 198c, and 198d are assembled to form a scissor linkage. In this embodiment, the seat support 193 is connected via the scissor linkage to the sliding blocks 109 and 111, such that an increase in track width and wheelbase length of the vehicle will result in an automatic and significant lowering of the seat. Similarly, a reduction in track width and wheelbase length of the vehicle will result in an automatic and significant raising of the seat. Lowering of the seat toward the chassis and thereby the ground, provides greater stability for the occupant during outdoor use (which is likely to involve higher speed motion than indoor use).

Bars 198a and 198d are pivoted at both ends; at the bottom end about a pivot pin mounted in sliding block 109 and at the top end about a pivot pin mounted in seat support 193.

Bars 198b and 198c are pivoted at the bottom end, about a pivot pin mounted in sliding block 111. At the top end, they are connected together by a pin through seat support 193, which is arranged to slide backward and forward along a guide slot.

A pivot 198e extends through the four bars to complete the scissor linkage.

FIG. 11a shows the vehicle in a mostly retracted configuration, with the seat in a corresponding relatively high position. FIG. 11b in contrast shows the vehicle chassis in a mostly expanded configuration, with the seat in a corresponding relatively low position. It is preferred that the seat is fully functional at any position between the raised and lowered position.

In addition, the chassis frame may be configured to lower toward the ground as the vehicle is moved toward the second expanded configuration. However, it may be desirable that the chassis frame does not lower, and instead the seat lowers, to maintain ground clearance.

It should be appreciated that the vehicle shown in FIGS. 11a and 11b may have other features described herein. For example, the seat could be configured to move forward to enable a user to easily enter or exit the seat. That could be achieved by mounting the seat 191 so it is slidable relative to the seat support 193. Additionally, by slightly further collapsing the chassis, at the same time the seat could be raised to enable easy entry or exit.

The vehicle is preferably driven by electric motors. In the embodiment shown in FIG. 1 for example, an individual electric motor 105a-105d is provided for each wheel. Electric motors can also be used to actuate the other parts of the vehicle, such as the steering as described above, the chassis adjustments, and seat adjustments. The electric motors will be powered by one or more batteries, and batteries will also power any controllers. In some embodiments, the vehicle will also be provided with an internal combustion motor for outdoor use, such as that shown schematically as item 141 in FIG. 1c. Indoors, where only a small range is required and emissions are unacceptable, the batteries will be used as the only source of power. For longer range outdoor use, the internal combustion motor can be operated. The internal combustion motor may for example be a two stroke or a four-stroke motor. Preferably, the motor is a four-stroke motor fuelled by LPG. An electric motor-generator such as that shown schematically as item 142 in FIG. 1c, will preferably be provided such that when the vehicle is being operated outdoors by the internal combustion motor, the internal combustion motor will drive the wheels via electricity created in the motor-generator, and the motor-generator will recharge the vehicle batteries for indoor use. The motor-generator will preferably also be used as a starter motor for the internal combustion engine.

The features of the vehicle will preferably be controlled by a number of microcomputers or controllers, such as one per electric motor for example. Preferably, the microcomputers or controllers will be configured to have a limited number of tasks, but any one of the microcomputers or controllers will be capable of controlling the vehicle fully (likely at a reduced rate) in the event that one or more of the other microcomputers or controllers fail.

The preferred embodiments provide vehicles that are suitable for use over a variety of terrains and conditions. Additionally, the preferred embodiments are readily adjustable between an indoor and outdoor configuration, either while the vehicle is stationary or moving, and while the vehicle is occupied.

The above describes preferred forms of the invention, and modifications may be made thereto without departing from the scope of the invention as defined by the following claims.

For example, while the invention is described with reference to personal mobility vehicles, the invention has application for other vehicles such as golf carts or go karts for example. The vehicle will be generally be configured to transport only one person, or possibly two in the case of a golf cart.

Additionally, alternative mechanisms from those described could be used to adjust the chassis, steer the wheels, adjust the suspension, move the seat, cud drive the vehicle for example.

The invention claimed is:

1. A vehicle for transporting a person, comprising:
   a chassis; and
   four wheels supporting the chassis above a ground surface and which enable the vehicle to move along the ground surface, the vehicle having a wheelbase length and a track width with the wheelbase length and track width each having a respective minimum size and a respective maximum size, each of the four wheels being adjustable in position to enable the wheelbase length and the track width of the vehicle to be changed, and each of the four wheels being steerable to enable the changes in the wheelbase length and track width to be effected when the vehicle is occupied, whether the vehicle is substantially stationary or in motion, and wherein the vehicle is adjustable between a first configuration of the chassis in which the wheelbase length and track width are both their respective minimum size and a second configuration of the chassis in which the wheelbase length and track width are both their respective maximum size.

2. A vehicle as claimed in claim 1, wherein each of the wheels is independently drivable.

3. A vehicle as claimed in claim 1, configured such that the wheelbase length and track width of the vehicle are adjusted concurrently.

4. A vehicle as claimed in claim 1, wherein the chassis is fully functional in any configuration between the first and second configurations.

5. A vehicle as claimed in claim 1, wherein the wheels are steered such that they move between a configuration in which all wheels are directed outwardly such that portions of the wheels distal a central portion of the chassis aim outwardly from the chassis in the first configuration of the chassis and a configuration in which the wheels are generally parallel in the second configuration of the chassis, to minimise damage to the ground surface and stress or damage to the chassis components if the chassis is adjusted between the first and second configuration when the vehicle is substantially stationary.

6. A vehicle as claimed in claim 5, wherein the wheels located toward one end of the vehicle are driven in an opposite direction to the wheels located toward the other end of the vehicle, as the chassis is adjusted between the first and second configuration.

7. A vehicle as claimed in claim 1, wherein the wheels can adopt a configuration in which all wheels are directed inwardly such that portions of the wheels distal a central portion of the chassis aim inwardly, such that the vehicle can be turned with little or no linear movement of the vehicle.

8. A vehicle as claimed in claim 7, wherein each wheel is driven in the same rotational direction when viewed from outside the respective wheel, to turn the vehicle.

9. A vehicle as claimed in claim 1, wherein the wheels can adopt a configuration in which the wheels located toward one end of the vehicle both aim in one direction, and the wheels located toward the other end of the vehicle both aim in the opposite direction, to enable the vehicle to negotiate relatively sharp turns.

10. A vehicle as claimed in claim 1, wherein the wheels can adopt a configuration in which the wheels located toward one end of the vehicle both aim in one direction, and the wheels located toward the other end of the vehicle both aim in the same direction as the other wheels, to enable the vehicle to achieve a translational movement.

11. A vehicle as claimed in claim 1, wherein the wheels located toward one end of the vehicle are supported by respective arms that are operatively connected to a first support block, and the wheels located toward the other end of the vehicle are supported by respective arms that are operatively connected to a second support block, and the support blocks are slidable along part of the chassis such that when the support blocks are in their most spaced apart positions the wheelbase length and track width are both their respective maximum size and when the support blocks are in their most close together positions the wheelbase length and track width are both their respective minimum size.

12. A vehicle as claimed in claim 1, comprising a drive motor associated with each of the wheels and configured such that each of the wheels can be independently driven by its respective drive motor.

13. A vehicle as claimed in claim 12, wherein the drive motors are electric motors.

14. A vehicle as claimed in claim 12, wherein each drive motor and thereby each wheel can be driven in a forward or rearward direction.

15. A vehicle as claimed in claim 1, wherein a vertical position of each wheel relative to a central portion of the chassis is adjustable and the vehicle comprises a control system configured to automatically adjust the vertical position of any one or more of the wheels relative to the central portion of the chassis to maintain the centre of gravity towards the centre of the vehicle and substantially maintain the occupant's orientation.

16. A vehicle as claimed in claim 1, configured such that the centre of gravity of an occupant of the vehicle is lower in the second configuration of the chassis than in the first configuration of the chassis.

17. A vehicle as claimed in claim 16, wherein a seat for supporting the occupant of the vehicle is lower to the chassis in the second configuration of the chassis than in the first configuration of the chassis.

18. A vehicle as claimed in claim 1, which comprises a seat for supporting an occupant, and comprising a mounting arrangement which mounts the seat to the chassis, wherein the mounting arrangement is configured such that the seat can be moved from a first in-use position wherein it is generally centrally disposed over the chassis to a second loading/unloading position which is forward of the first in-use position, with the second position raised and forward of the first position.

19. A vehicle as claimed in claim 18, wherein the seat has an intermediate position between the first in-use position and the second loading/unloading position, which is forward and raised from the first in-use position, and the second loading/unloading position is forward and raised from the intermediate position, and wherein the seat is fully functional in the intermediate position.

20. A vehicle as claimed in claim 19, wherein the mounting arrangement comprises a four bar linkage configured such that the seat automatically raises as it moves forward from the first position to the second position.

21. A vehicle as claimed in claim 18, wherein the seat remains at a substantially constant angle throughout the movement.

22. A vehicle as claimed in claim 1, wherein the vehicle is adapted for indoor and outdoor use.

23. A vehicle as claimed in claim 22, comprising at least one battery powered electric motor arranged to drive at least one of the wheels of the vehicle in an indoor environment, and an internal combustion motor arranged to drive at least one of the wheels of the vehicle via a motor-generator in an outdoor environment and to charge the batteries of the electric motor(s) during the outdoor operation.

24. A vehicle as claimed in claim 1, wherein the vehicle is a personal mobility vehicle.

\* \* \* \* \*